United States Patent [19]

Yamasaki

[11] 4,174,099
[45] Nov. 13, 1979

[54] SAFETY DEVICE FOR USE WITH SPEED CHANGE GEAR SYSTEM OF A BICYCLE

[75] Inventor: Kazuto Yamasaki, Sakai, Japan

[73] Assignee: Maeda Industries, Ltd., Osaka, Japan

[21] Appl. No.: 877,739

[22] Filed: Feb. 14, 1978

[30] Foreign Application Priority Data

Feb. 14, 1977 [JP] Japan .............................. 52-17130[U]

[51] Int. Cl.² .................................................. F16F 3/04
[52] U.S. Cl. ................................ 267/168; 74/501.5 R; 280/236
[58] Field of Search ................. 280/236; 267/135, 168; 74/501.5 R, 510, 217 B

[56] References Cited

U.S. PATENT DOCUMENTS

| | | | |
|---|---|---|---|
| 3,039,758 | 6/1962 | Gratzmuller | 267/168 X |
| 3,398,973 | 8/1968 | Shimano et al. | 280/236 |
| 3,588,077 | 6/1971 | Ozaki | 267/176 |

FOREIGN PATENT DOCUMENTS

47-48452 12/1972 Japan ..................................... 74/217 B

Primary Examiner—Joseph F. Peters, Jr.
Assistant Examiner—Michael Mar
Attorney, Agent, or Firm—Birch, Stewart, Kolasch & Birch

[57] ABSTRACT

A safety device for use with a speed change gear system for a bicycle which comprises a casing mountable in position to a bicycle frame, a hollow shell member disposed within the casing, a resilient member including at least one first coil spring of large diameter and a second coil spring of a smaller diameter disposed within the shell member in axial alignment and partial overlapping relation with each other. Further, at least three axial spaced slide members are disposed within the shell member so as to be cooperative with the resilient member. A tubular sheath extends in curved position and is connected at one end to a rear derailleur and at the other end to one of the slide members, and a gearshift wire passes through the safety device and the tubular sheath.

9 Claims, 7 Drawing Figures

SAFETY DEVICE FOR USE WITH SPEED CHANGE GEAR SYSTEM OF A BICYCLE

BACKGROUND AND SUMMARY OF THE INVENTION

The present invention relates to a safety device for protecting a speed change gear system for a bicycle more particularly to a safety device which is associated with a gearshift wire and a tubular sheath therefor in order to prevent a rear derailleur, a speed change lever and/or the gearshift wire per se from being damaged by the careless operation of the speed change lever by a bicyclist.

In such type of bicycles equipped with a multiple free-wheel and a rear derailleur, the speed change can be effected by transferring the endless chain from one sprocket wheel to another only when the chain is in its running motion. If the speed change lever is operated in a careless attempt when the bicycle is standing still and the chain is not in running motion, the gearshift wire, the speed change lever and/or the rear derailleur may occasionally be damaged. To describe this in detail in conjunction with FIG. 7 of the accompanying drawings, in the state where a tubular sheath (S) having a curved posture is rigidly secured at its ends (P, Q) and the gearshift wire (W) is fixed at its end (E), and the curved part of the gearshift wire (W), which is disposed within the tubular sheath (S) so as to extend therethrough, is forcibly pulled in the direction of an arrow (A), the curved part of the gearshift wire is naturally strained to draw near rectilinearity. However, the tubular sheath (S) maintains its original curved posture because it is usually made of inelastic material and rigidly secured at its ends (P, Q). Consequently, the gearshift wire is hindered from approaching rectilinearity under the restrictive function of the curved tubular sheath holding the curved part of the wire (W) therein, resulting in that the gearshift wire undergoes such excessive tension that may cause the wire to be undesirably stretched or make parts of the rear derailleur and/or the speed change lever forcibly deformed.

In order to eliminate the above-mentioned deficiencies, an improved type of safety device has been proposed in U.S. Pat. No. 3,588,077 to Ozaki, in which one end (R) of the inelastic tubular sheath (S) is arranged so as to be axially movable and a coil spring (C) is disposed about the gearshift wire (W) and connected to said end (R) of said sheath (S). According to this structure of U.S. Pat. No. 3,588,077, when the gearshift wire (W) is pulled, in operation, in the direction of the arrow (A), the movable end (R) of the sheath (S) is shifted in the same direction, compressing the coil spring (C), so that the sheath may be permitted to deform into a more rectilinear posture, as the curved part of the gearshift wire (W) is forced to approach rectilinearity. Thus, the above-mentioned deficiencies may be overcome.

However, according to the above-described structure of the safety device of said U.S. patent to Ozaki, the coil spring (C) utilized therein must be long enough to permit movement through a sufficient distance of the end (R) of the sheath (S) in order to obtain the desirable long deformation of the sheath. However, if such a long coil spring is employed, the spring constant thereof is inevitably reduced and the stiffness of spring is insufficient, which causes inferiority in the expected function of the gearshift wire. Further, by employment of a long coil spring, the axial dimension of the whole safety device becomes unfavorably larger.

Therefore, one object of the present invention is to provide an improved safety device for the speed change gear system of a bicycle, which may eliminate the above-mentioned deficiencies seen in the conventional safety device.

Another object of the invention is to provide a safety device for the speed change gear system of a bicycle, which is compact in size but permits movement through a sufficient distance of the movable end of the tubular sheath.

A further object of the invention is to provide a safety device for the speed change gear system of a bicycle, which utilizes a specific combination of at least one coil spring of a large diameter and a further coil spring of a small diameter for absorbing excessive tension in the gearshift wire.

The above and other objects, features and advantages of the present invention will become more apparent from the following description of the preferred embodiments thereof taken in conjunction with the accompanying drawings. It is to be expressly understood, however, that the drawings are for purpose of illustration only and are not intended as to define the limits of the present invention, since various changes and modifications within the spirit and scope of the invention will be apparent to those skilled in art from the detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
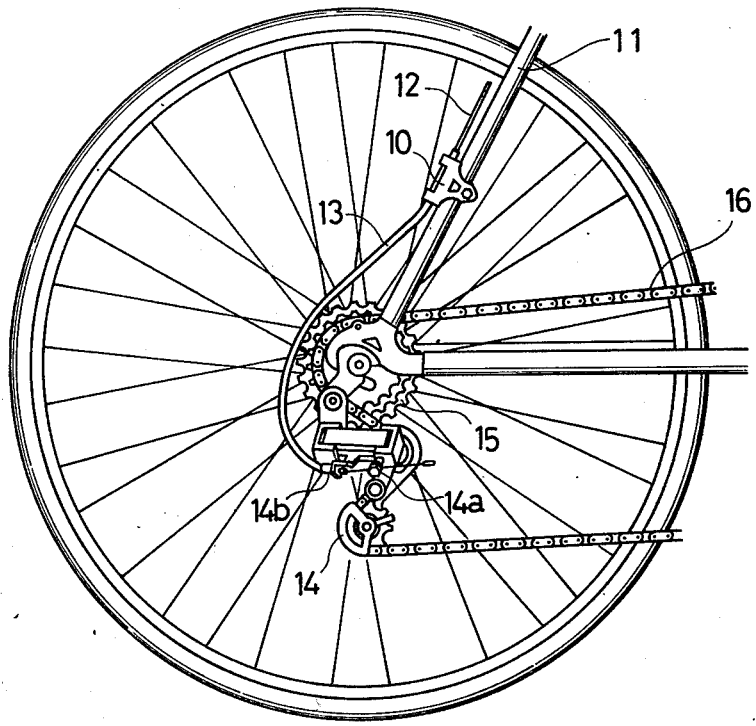
FIG. 1 is a fragmentary elevation showing a rear part of a bicycle, in which a safety device accroding to the present invention is mounted on a frame tube of a bicycle.
Figure 2:
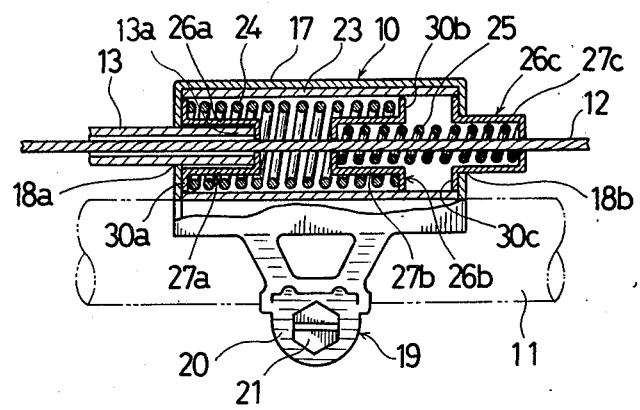
FIG. 2 is a sectional view of one preferred embodiment of the safety device of the present invention.
Figure 3:
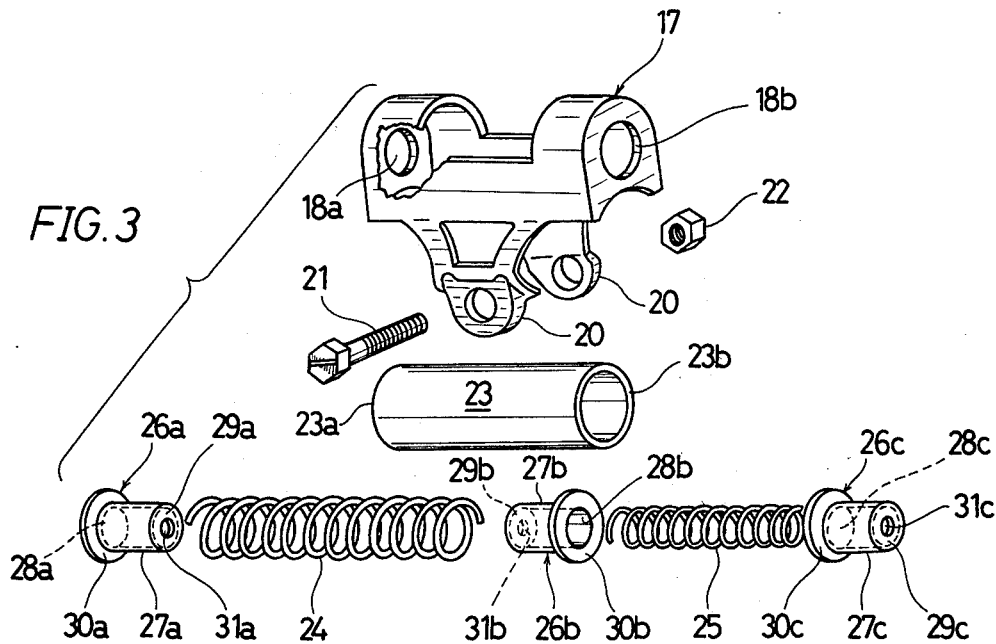
FIG. 3 is an exploded illustration showing, in enlarged scale, the component parts of the safety device of FIG. 2.

Referring now to the drawings, and more particularly to FIGS. 1 to 3, the safety device 10 as a typical embodiment of the present invention is secured in position to a bicycle frame tube, preferably to a seat stay 11, in association with a gearshift wire 12 and a tubular sheath 13. More particularly, the gearshift wire 12 passes through the safety device 10 as well as said tubular sheath 13 and is conventionally connected at one end to a derailleur part 14a (FIG. 1) and at the other end to a speed change lever (not shown). The tubular sheath 13 is connected at one end to the safety device 10 and at the other end to a derailleur part 14b (FIG. 1) in the known manner. The rear derailleur 14 cooperates with a multiple freewheel 15 mounted to a bicycle rear wheel hub spindle to switch over the endless chain 16 from one sprocket wheel to another when the gearshift wire is operated with the speed change lever conventionally.

The safety device 10 comprises a casing 17 having openings 18a, 18b formed at opposite ends thereof. The casing 17 further includes a known mounting means 19, which may be, for example, a combination of a pair of ears 20 with a hole, a clamping screw 21 and a nut 22, said screw 21 being inserted through said ears 21 and engaged at its threaded shank end with said nut 22 in order to fixedly mount the safety device 10 to a bicycle frame tube 11 or the like. The structure and configuration of the casing per se should not be limited to that of FIG. 3, since various changes and modifications will be readily apparent to those skilled in the art.

A hollow, cylindrical shell member 23 with open ends 23a, 23b is disposed within said casing 17, in such a manner that said ends 23a, 23b are respectively in contact with the internal portion of the end walls of the casing 17, so that the shell member 23 is restricted from moving within the casing 17.

Disposed within the shell member 23 are a resilient means including a first coil spring 24 with a larger diameter and a second coil spring 25 with a smaller diameter, and three slide members, viz. the first slide member 26a, the second slide member 26b and the third slide member 26c, respectively. Each of these three slide members utilized in this embodiment may preferably be substantially the same or quite similar in configuration, having a hollow cylindrical body 27a, 27b, or 27c with an opening 28a, 28b, or 28c at one side and an end wall 29a, 29b, or 29c at the other side, respectively. An annular flange 30a, 30b, or 30c is formed integral with the respective openings 28a, 28b and 28c of the cylindrical body, and a hole 31a, 31b, or 31c is formed respectively in said end wall. The internal diameter of each of said holes 31a, 31b, or 31c should be determined so that the gearshift wire 12 can pass therethrough.

The first slide member 26a is disposed within the cylindrical shell 23 so as to be slidable mounted therein, with its flange portion 30a directed to the one end 23a of the shell 23. One end 13a of the tubular sheath 13 extends into the shell member 23 through the opening 18a and is fixedly secured within the cylindrical body 27a of the first slide member 26a as shown in FIG. 2. The third slide member 26c is disposed within the shell member 23 in such a manner that its cylindrical body portion 27c extends outwardly through the opening 18b as shown in FIG. 2. The second slide member 26b is also disposed within the hollow of the cylindrical shell member 23, in such a manner that it is axially slidable in the opposite directions within the axial space between the first slide member 26a and the third slide member 26c, with its end wall 29b directed toward the first slide member 26a and with its flange portion 30c directed toward the third slide member 26c. The three slide members 26a, 26b, 26c are in axial alignment with one another as shown in FIG. 2.

The first coil spring 24, whose external diameter is slightly smaller than the internal diameter of the cylindrical shell member 23 and whose internal diameter is slightly larger than the external diameter of the cylindrical body of the slide members, is interposed between the flange 30a of the first slide member 26a and the flange 30b of the second slide member 26b so as to urge both members 26a, 26b in the opposite axial directions, in which both of the cylindrical body portions 27a, 27b of the slide members 26a, 26b are disposed within the coil spring 24. The other coil spring 25, whose external diameter is slightly smaller than the internal diameter of the hollow cylindrical body of each of the slide members, is interposed between the end wall 29b of the second slide member 26b and the end wall 29c of the third slide member 26c, wherein one end of the spring 25 extends into and is disposed within the hollow of the cylindrical body 27b, while the other end thereof extends into and is disposed within the hollow of the cylindrical body 27c, as shown in FIG. 2. Thus, the three slide members 26a, 26b, 26c and the two coil springs 24, 25 are in axial alignment with a common center line and the gearshift wire 12 extends in said center line and through these components.

Thus, in operation, the end 13a of the tubular sheath 13 is supported by the safety device 10 so as to be axially movable under the resilient function of the cooperative coil springs 24, 25, as the gearshift wire 12 is tensioned so as to approach rectilinearity under the operation of the speed change lever in the state where the chain 16 is not in running motion. As a result, the development of an undesirable permanent stretch in the gearshift wire can be prevented as well as damage to parts of the rear derailleur and/or the speed change lever may be prevented from being damaged. These advantages may, however, be obtained as well by the device disclosed in said U.S. patent to Ozaki.

Figure 6:
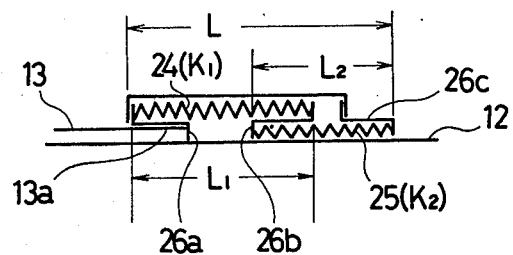
FIG. 6 is a diagrammatic view presented for convenience of explaining the function of the safety device of the present invention.
Figure 7:
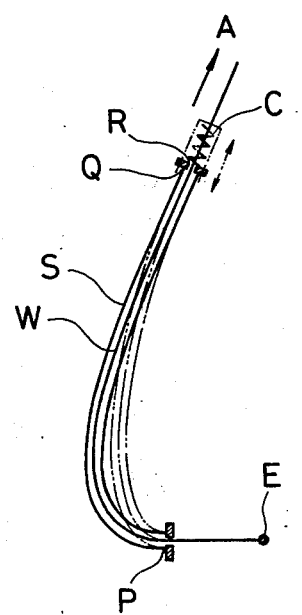
FIG. 7 is a schematic illustration showing a fundamental construction and operational manner of a typical prior art device.

It should be noted that the most important feature of the present invention consists in the particular arrangement of the resilient means including at least one first coil spring having a larger diameter and a second coil spring having a smaller diameter and at least three slide members, said coil springs being disposed in partially overlapped relation with each other so that an axial force imparted to the first coil spring may be transmitted to the second coil spring and the excessive tension in the gearshift wire is thereby absorbed, and said slide members being arranged so as to cooperate with said coil springs within the cylindrical shell member. More particularly, as shown in FIG. 6, the total axial length defined by the length $L_1$ of the first coil spring 24 plus the length $L_2$ of the second spring 25 is larger than the length L defined by the axial length of the cylindrical shell 23 plus the length of the outwardly projecting portion of the third slide member 26c. It will be easily understood that said arrangement facilitates enlarging the axially movable distance or stroke of the tubular sheath 13. Further, assuming that $K_1$ stands for the spring constant of the first coil spring 24 with a larger diameter and that $K_2$ stands for the second coil spring 25 with a smaller diameter, the total spring constant K of the resilient means is expressed in the formula $K=1/(1/K_1+1/K_2)$. As can be seen from this formula, it is possible to make the value of $K_2$ large enough, since the diameter of the second coil spring 25 is small. Therefore, according to the present invention, it is possible to make the value of K sufficiently larger as compared to a combination of two coil springs having the same large diameter. In this connection, it is a matter of course that the value of K must be larger than the value of the spring constant of a known return spring of the rear derailleur.

Figure 4:
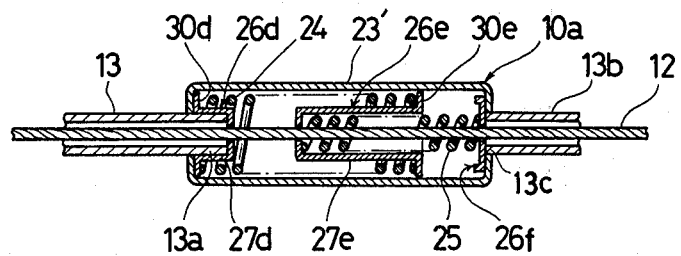
FIG. 4 is a sectional view of a modified embodiment according to the present invention.

FIG. 4 shows another embodiment of the present invention, in which the construction is basically the same as that of the first embodiment described in the foregoing and illustrated in FIGS. 2 and 3. However, a further tubular sheath 13b is provided so as to extend between the safety device 10a and the speed change lever (not shown), one end 13c of said tubular sheath 13b being connected to a disk-like slide member 26f. Since the end portion 13c of the tubular sheath 13b can perform substantially the same function as the cylindrical body portion 26c in the first embodiment, the slide member 26f of this second embodiment may dispense with the provision of a cylindrical body corresponding to said cylindrical body 26c.

A slide member 26d including a cylindrical body 27a and an annular flange 30d is slidably disposed within the shell member 23' in the same manner as the slide member 26a of the first embodiment. A further slide member 26e including a cylindrical body 27e and an annular flange 30e is also disposed within said shell member 23' in the same manner as the second slide member 26d of the first embodiment. The first and the second coil springs 24, 25 are likewise arranged within the shell member 23 in the same manner as in the first embodiment.

In operation, the end portion 13c of the sheath 13b as well as the end portion 13a of the sheath 13 are movable in the axial direction, compressing the coil springs 24, 25, whereby the undesirable permanent stretch in the gearshift wire may be prevented. The other operational manner and advantages thereof are substantially the same as with those of of the first embodiment.

Figure 5:
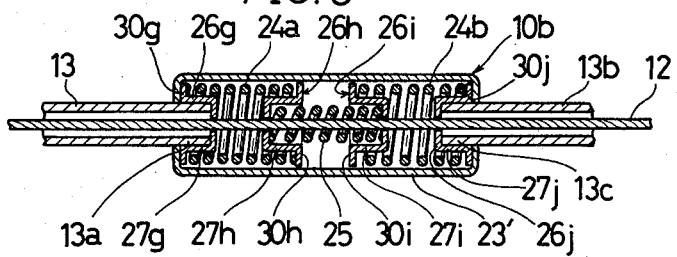
FIG. 5 is a similar view to FIG. 4, showing a further modification of the present invention.

FIG. 5 shows a further modified embodiment of the present invention, which is constructed on the same principle as the first and the second embodiments. However, instead of the first coil spring 24 of larger diameter in the first embodiment, a pair of coil springs 24a, 24b are utilized, these coil springs 24a, 24b are of the same size and structure. Further, in place of the second slide member 26b in the first embodiment, a pair of intermediate slide members 26h, 26i of the same structure are utilized, said member 26h includes a cylindrical body 27h and an annular flange 30h while the other member 26i includes a cylindrical body 27i and an annular flange 30i. The two intermediate slide members 26h, 26i may be of same construction but arranged oppositely so that the flange portion 30h, 30i face each other. The leftmost slide member 26g including a cylindrical body 27g and an annular flange 30g are substantially the same in structure and arrangement with the first slide member 26a in the first embodiment. The rightmost slide member 26j including a cylindrical body 27j and an annular flange 30j is substantially the same in structure as the third slide member 26c in the first embodiment but different in arrangement therefrom. Namely, the slide member 27j is disposed within the shell member 23' with its flange portion 30j directed outwardly and the cylindrical body 27j thereof does not project from the shell 23' which may be mountable to a bicycle frame without using the casing 17.

The one coil spring 24a of a larger diameter is interposed between the two flanges 30g and 30h, while the other coil spring 24b of a larger diameter is interposed between the flanges 30i and 30j. The additional coil spring 25 of a smaller diameter is interposed between said two intermediate slide members 26h, 26i, in such a manner that the opposite ends of the spring 25 extend into each of the cylindrical bodies 27h, 27i, respectively, and are in contact with each end wall of said cylindrical bodies. Thus, the coil spring 25 is disposed in partially overlapped relation at its opposite ends with said two coil springs 24a, 24b of larger diameter as shown in FIG. 5, so that axial forces imparted to the coil springs 24a, 24b are transmitted to the coil spring 25.

As can be readily understood from the foregoing description, the present invention has the advantageous features that the curved tubular sheath connected to the rear derailleur can be easily deformed so as to approach rectilinearity since a sufficient stroke of the movable end of the tubular sheath is obtained under the cooperation of the resilient means and the plurality of slide members disposed within the shell member. Further, the gearshift wire can be properly tensioned under the function of the resilient means having a sufficiently large spring constant, whereby the gearshift wire, the rear derailleur and/or the speed change lever can be prevented from being damaged by a careless operation of the speed change lever by a bicyclist when the endless chain is not in running motion, without reducing the function of the gearshift wire.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A safety device for use with a speed change gear system of a bicycle comprising:

a hollow cylindrical shell member having an opening at opposite ends thereof, respectively;

a first coil spring of larger diameter and a second coil spring of smaller diameter, both of which are disposed within said shell member in coaxial alignment and in partially overlapped relation with each other;

three axially spaced slide members, viz., a first slide member, a second slide member, and a third slide member, axially slidably disposed within said shell member, respectfully, so as to cooperate with said first and second coil springs;

each of said three slide members including a hollow cylindrical body which has an opening end at one side formed with an integral annular flange, and an end wall at the other side formed with a through hole for permitting a bicycle gearshift wire to pass therethrough;

said first slide member being disposed adjacent one end of said shell member and connected to one end of a tubular sheath which extends between said shell member and a rear derailleur for bicycle speed change;

said gearshift wire passing through said tubular sheath for operatively connecting said rear derailleur with a speed change lever of a bicycle;

said second slide member being disposed between said first slide member and said third slide member;

said third slide member being disposed adjacent the other end of said shell member;

said first slide member being disposed with its cylindrical body directed axially inward;

said second slide member being disposed with its cylindrical body axially directed toward said first slide member;

said third slide member being disposed in such a manner that its cylindrical body projects out of one end of said shell member;

said first coil spring being interposed in abutment between said annular flange of said first slide member and said annular flange of said second slide member, and said second coil spring being interposed in abutment between said end wall of said second slide member and said end wall of said third slide member.

2. A safety device for use with speed change gear system of a bicycle comprising:

a hollow shell member having an opening at opposite ends thereof, respectively;

a resilient means including at least one first coil spring of larger diameter and at least one second coil spring of smaller diameter disposed within said shell member;

said first coil spring and said second coil spring being arranged in axial alignment in partially overlapped relation with each other;

at least three axially spaced slide members, viz., a first slide member, a second slide member, and a third slide member, slidably disposed within said shell member, respectively, so as to cooperate with said resilient means;

said first slide member being connected with one end of a first tubular sheath which extends, in curved position, between said shell member and a rear derailleur and said first tubular sheath is fixedly connected at the other end thereof to a part of said rear derailleur;

said second slide member being located between said first slide member and said third slide member;

said third slide member is a disk-like member and a second tubular sheath is connected at one end to said disk-like member;

each of said slide members having a hole for permitting a gearshift wire to pass therethrough;

said gearshift wire operatively connecting said rear derailleur with a speed change lever of a bicycle; and a curved part of said gearshift wire passing through said first tubular sheath and being fixedly connected at one end of said gearshift wire to a part of said rear derailleur.

3. The safety device according to claim 2 wherein said shell member is of cylindrical shape.

4. The safety device according to claim 2 wherein said first coil spring of larger diameter is interposed between said first slide member and said second slide member, and said second coil spring of smaller diameter is interposed between said second slide member and said third slide member.

5. A safety device for use with speed change gear system of a bicycle comprising:

a hollow cylindrical shell member having an opening at opposite ends thereof, respectively;

a pair of first coil springs of larger diameter and one second coil spring of smaller diameter which are disposed within said shell member in coaxial alignment and in partially overlapped relation;

a first slide member, a pair of intermediate slide members, and a third slide member which are axially spaced apart and axially slidably disposed within said shell member, respectively, so as to cooperate with said first and second coil springs;

said first slide member being disposed adjacent one end of said shell member and connected to one end of a first tubular sheath which extends between said shell member and a rear derailleur for bicycle speed change;

said gearshift wire passing through said first tubular sheath for operatively connecting said rear derailleur with a speed change lever of a bicycle;

said third slide member being disposed adjacent the other end of said shell member;

one of said pair of coil springs of larger diameter being interposed between said first slide member and one of said pair of intermediate slide members;

the other of said pair of coil springs of larger diameter being interposed between the other of said pair of intermediate slide members and said third slide member; and said coil spring of smaller diameter being interposed between said pair of intermediate slide members.

6. The safety device according to claim 5, wherein each of said first slide member, said pair of intermediate slide members and said third slide member, has a hollow cylindrical body which has an opening end at one side formed with an integral annular flange, and an end wall at the other side and a hole is formed in said end wall of each cylindrical body of said slide members for permitting said gearshift wire to pass therethrough.

7. A safety device for use with speed change gear system of a bicycle comprising:

a hollow cylindrical shell member having an opening at opposite ends thereof, respectively;

a pair of first coil springs of larger diameter and one second coil spring of smaller diameter which are disposed within said shell member in coaxial alignment and in partially overlapped relation;

a first slide member, a pair of intermediate slide members, and a third slide member which are axially spaced apart and axially slidably disposed within said shell member, respectively, so as to cooperate with said first and second coil springs;

each of said slide members including a hollow cylindrical body which has an opening end at one side formed with an integral annular flange, and an end wall at the other side formed with a through hole for permitting a bicycle gearshift wire to pass therethrough;

said first slide member being disposed adjacent one end of said shell member and connected to one end of a first tubular sheath which extends between said shell member and a rear derailleur for bicycle speed change;

said gearshift wire passing through said first tubular sheath for operatively connecting said rear derailleur with a speed change lever of a bicycle;

said third slide member being disposed adjacent the other end of said shell member;

said pair of intermediate slide members being disposed between said first slide member and said third slide member in such a manner that flanges thereof face each other;

said first slide member being disposed with its cylindrical body directed axially inward;

said third slide member being disposed with its cylindrical body directed axially inward;

one of said pair of first coil springs being interposed in abutment between flanges of said first slide member and one of said pair of intermediate slide members;

the other of said pair of first coil springs being interposed between flanges of said third slide member and the other of said pair of intermediate slide members;

said second coil spring being interposed in abutment between end walls of said pair of intermediate slide members; and a second tubular sheath being fixedly connected at its one end to said third slide member.

8. The safety device according to claim 1, 2, 5 or 7, wherein said shell member is disposed within a casing;

said casing having an opening at opposite ends thereof, respectively, and said casing being provided with a mounting means for mounting said safety device to a bicycle frame.

9. The safety device according to claim 8, wherein said mounting means includes at least a pair of ears formed with said casing, each of said ears having a through hole, at least one clamping screw having a threaded shank and at least one nut, and said clamping screw being inserted through said ears and engaged with said nut.

* * * * *